(12) United States Patent
Hitchcock et al.

(10) Patent No.: US 10,793,248 B2
(45) Date of Patent: Oct. 6, 2020

(54) DEVICES AND METHODS TO CAPTURE MOISTURE FROM A STRUCTURAL MEMBER

(71) Applicant: The Boeing Company, Chicago, IL (US)

(72) Inventors: Cory Michael Hitchcock, Everett, WA (US); Adam Joseph Brockett, Everett, WA (US); Kenneth George Davis, Brier, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/798,045

(22) Filed: Oct. 30, 2017

(65) Prior Publication Data

US 2019/0127039 A1 May 2, 2019

(51) Int. Cl.
*B64C 1/06* (2006.01)
*B64C 1/40* (2006.01)
*B65D 1/36* (2006.01)

(52) U.S. Cl.
CPC ............... *B64C 1/067* (2013.01); *B64C 1/40* (2013.01); *B65D 1/36* (2013.01)

(58) Field of Classification Search
CPC .......... B64C 1/067; B64C 1/066; B64C 1/40; B64C 1/403; E04D 2013/0486; E04D 13/0481; E04D 2013/0463; E04D 2013/049; B64F 5/10; B65D 1/36
USPC ....... 244/129.1; 52/14, 16, 94, 95, 97, 302.1
See application file for complete search history.

(56) References Cited

U.S. PATENT DOCUMENTS

| | | | | |
|---|---|---|---|---|
| 3,994,055 | A | * 11/1976 | Maloney, Jr. | .......... B21D 28/10 29/890.14 |
| 4,235,398 | A | 11/1980 | Johnson | |
| 4,258,510 | A | * 3/1981 | Guiana | .................. E04D 13/04 52/11 |
| 4,641,464 | A | * 2/1987 | Andersson | .............. E04D 13/08 52/16 |
| 5,067,291 | A | 11/1991 | Evensen | |
| 5,094,040 | A | * 3/1992 | Bunka | .................. E04D 13/031 52/14 |

(Continued)

FOREIGN PATENT DOCUMENTS

| CN | 207331882 U | 5/2018 |
|---|---|---|
| EP | 093485 A | 8/1999 |

(Continued)

OTHER PUBLICATIONS

Huber et al. 'Controlling Nuisance Moisture in Commercial Airplanes' Aero 05 (QTR_01 1999) (Retrieved from the internet at the following URL: http://www.boeing.com/commercial/aeromagazine/articles/2015_q1/archive.html) Jan. 1999.

(Continued)

*Primary Examiner* — Theodore V Adamos
(74) *Attorney, Agent, or Firm* — Coats & Bennett, PLLC

(57) ABSTRACT

Devices and methods to capture moisture at a structural member in a vehicle. The devices include a flexible tray that can snap-fit onto an exterior of the structural member. Once attached, the flexible tray can collect moisture from the structural member. A diverter is coupled to the flexible tray. The diverter diverts the collected moisture away from the structural member.

20 Claims, 11 Drawing Sheets

(56) References Cited

U.S. PATENT DOCUMENTS

| | | | | |
|---|---|---|---|---|
| 5,195,281 A * | 3/1993 | Kosko | ............... | E04D 12/00 |
| | | | | 52/11 |
| 5,577,688 A * | 11/1996 | Sloan | ............... | B64C 1/067 |
| | | | | 244/117 R |
| 5,752,347 A * | 5/1998 | Osborn | ............... | E04D 13/076 |
| | | | | 138/92 |
| 5,788,184 A | 8/1998 | Eddy | | |
| 5,827,598 A | 10/1998 | Larsen et al. | | |
| 6,212,837 B1 * | 4/2001 | Davis | ............... | E04B 1/003 |
| | | | | 52/302.1 |
| 6,315,849 B1 | 11/2001 | Ross | | |
| 6,531,206 B2 | 3/2003 | Johnston et al. | | |
| 6,668,491 B1 * | 12/2003 | Bonerb | ............... | E04D 13/076 |
| | | | | 52/1 |
| 6,694,686 B2 * | 2/2004 | Ready | ............... | E04B 5/12 |
| | | | | 52/302.1 |
| 6,746,567 B2 | 6/2004 | Johnston et al. | | |
| 6,803,090 B2 | 10/2004 | Castiglione et al. | | |
| 7,677,500 B2 | 3/2010 | Redecker | | |
| 8,317,353 B1 * | 11/2012 | Martin | ............... | F21S 4/10 |
| | | | | 248/339 |
| 8,745,928 B2 | 6/2014 | Greiner | | |
| 2003/0024185 A1 | 2/2003 | Menzies | | |
| 2003/0102076 A1 | 6/2003 | Johnston et al. | | |
| 2003/0104170 A1 | 6/2003 | Johnston et al. | | |
| 2006/0162262 A1 * | 7/2006 | Smith | ............... | E04B 1/34342 |
| | | | | 52/58 |
| 2010/0044512 A1 * | 2/2010 | Paul | ............... | B64C 1/067 |
| | | | | 244/129.1 |
| 2011/0203191 A1 * | 8/2011 | Argentina | ............... | E04D 13/0645 |
| | | | | 52/12 |
| 2012/0119024 A1 * | 5/2012 | Redecker | ............... | B64C 1/403 |
| | | | | 244/1 N |
| 2012/0126059 A1 | 5/2012 | Piuzzi et al. | | |
| 2012/0234979 A1 * | 9/2012 | Smith | ............... | B64C 1/40 |
| | | | | 244/158.1 |
| 2013/0009010 A1 * | 1/2013 | Auriac | ............... | B64C 1/1453 |
| | | | | 244/129.1 |
| 2013/0020434 A1 * | 1/2013 | Muller | ............... | B64C 1/40 |
| | | | | 244/1 N |
| 2013/0168496 A1 | 7/2013 | Roth | | |
| 2016/0159454 A1 | 6/2016 | Fietz et al. | | |
| 2016/0160509 A1 * | 6/2016 | Anic | ............... | E04F 17/00 |
| | | | | 52/302.1 |
| 2016/0194879 A1 * | 7/2016 | Gleason | ............... | E04D 13/08 |
| | | | | 52/16 |
| 2017/0106965 A1 * | 4/2017 | Dickson | ............... | B64C 1/067 |

FOREIGN PATENT DOCUMENTS

| | | |
|---|---|---|
| EP | 1358064 | 11/2003 |
| EP | 3156322 A1 | 4/2017 |
| WO | 2003097344 | 11/2003 |

OTHER PUBLICATIONS

EP Search Report dated Mar. 20, 2019 in re EP Application No. 18188934.6.

* cited by examiner

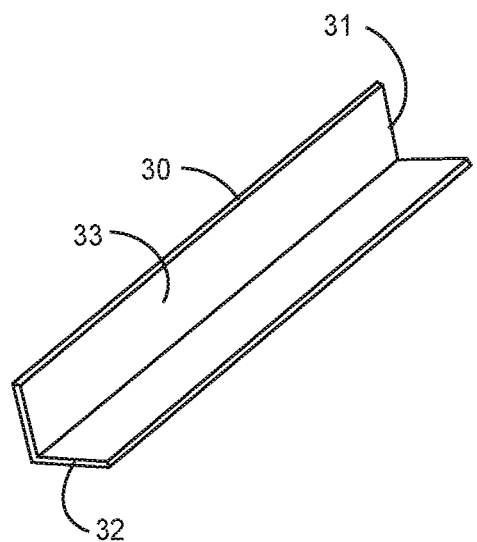
FIG. 7
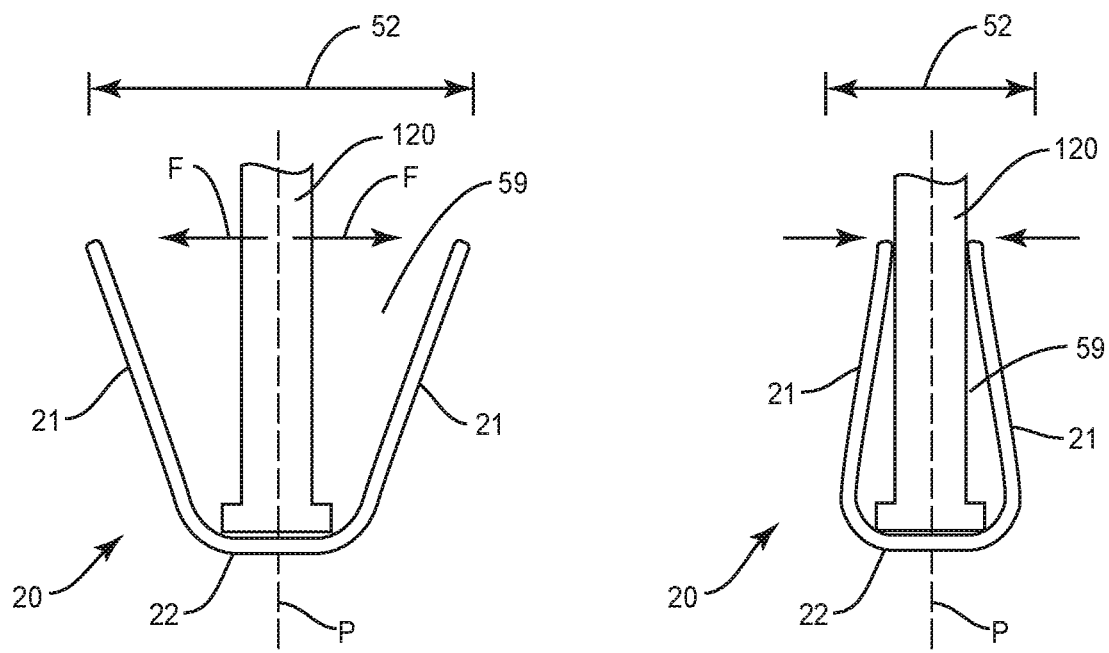
FIG. 8A  FIG. 8B

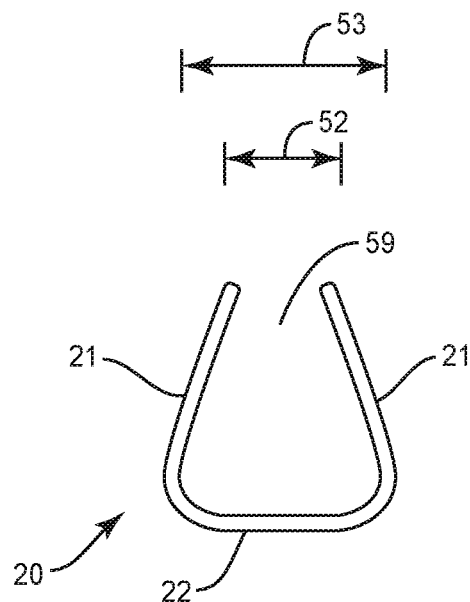
FIG. 9A
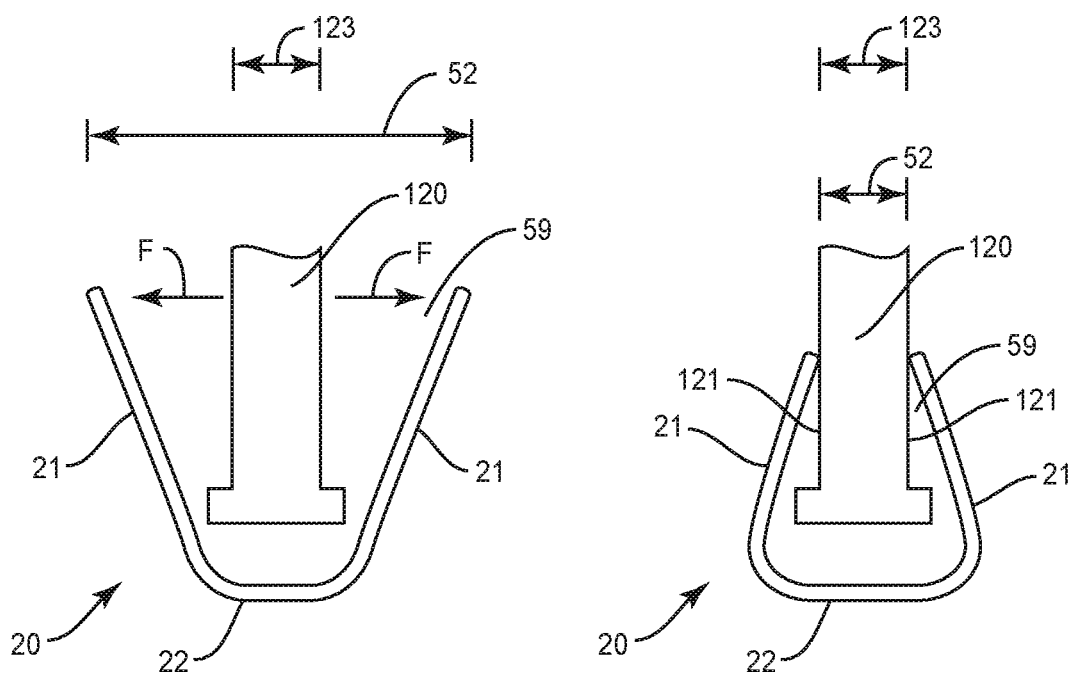
FIG. 9B
FIG. 9C

DEVICES AND METHODS TO CAPTURE MOISTURE FROM A STRUCTURAL MEMBER

TECHNOLOGICAL FIELD

The present disclosure generally relates to moisture control. More particularly, the present disclosure relates to devices and methods for capturing moisture from a structural member in a vehicle.

BACKGROUND

In an aircraft, the outer skin is spaced from the walls and ceiling of a passenger cabin (or other compartment), and the gap is at least partially filled with an insulation layer. The insulation layer is typically formed from a waterproof material. During a flight, moisture from moist air can condense against the skin and freeze during cruise. During decent, this frozen moisture can thaw and drip back down towards the cabin. Because the insulation layer is waterproof, the moisture can flow along the insulation layer and drain into the bilge. However, at some locations, structures and/or supports can protrude through the insulation layer. For example, structural members that hold monuments and bins to the crown extend from the structure at the skin, through the insulation layer, and towards the cabin. The insulation layers come with predefined holes for the structural members to extend through the insulation layer. The holes are lined, and there can be a gap defined between the inner surface of the hole and the structural member. When the moisture thaws, it can drip down through the hole and into the cabin.

One current practice is to manually wrap the structural member with a material so the material absorbs the moisture and allows the moisture to evaporate back into the air. However, the moisture can be more than the material can absorb.

SUMMARY

The present application includes devices and methods to capture moisture from a structural member. The devices include a flexible tray that is attached to the structural member and collects the moisture. A diverter attached to the flexible tray diverts the moisture away from the structural member.

One aspect is directed to a device to capture moisture from a structural member. The device a flexible tray that snap-fits onto an exterior of the structural member and collects the moisture from the structural member. A diverter is coupled to the flexible tray and diverts the moisture collected by the flexible tray away from the structural member.

Another aspect is directed to a method of capturing moisture from a structural member. The method includes expanding a flexible tray by moving apart opposing lateral sides of the flexible tray. While the flexible tray is expanded, the method includes positioning the flexible tray over the structural member with the lateral sides of the flexible tray on opposing sides of the structural member and a bottom of the flexible tray along the bottom of the structural member. The method includes releasing the lateral sides and applying a compressive force through the lateral sides to the structural member to secure the flexible tray onto the structural member.

Another aspect is directed to a vehicle with a structural member that includes opposing lateral sides and a bottom that extends between the sides. A moisture capture device captures moisture from a structural member. The moisture capture device includes a flexible tray configured to snap-fit onto the structural member and to collect the moisture from the structural member, and a diverter coupled to the flexible tray and configured to divert the moisture collected by the flexible tray away from the structural member.

BRIEF DESCRIPTION OF THE DRAWINGS

FIG. 7 is a perspective view of a diverter.

FIG. 8A is an end view of a tray that is flexed outward away from a central plane.

FIG. 8B is an end view of the tray of FIG. 8A that has returned towards an initial position.

FIG. 9A is an end view of a tray of a device in an unflexed orientation.

FIG. 9B is an end view of the tray of FIG. 9A that is flexed outward and extending around a structural member.

FIG. 9C is an end view of the tray of FIG. 9B that is attached to the structural member.

DETAILED DESCRIPTION

The present application is directed to devices and methods to capture moisture from a structural member in a vehicle. The devices include a flexible tray that can snap-fit onto an exterior of the structural member. Once attached, the flexible tray can collect moisture that runs off from the structural member. The device also includes a diverter that is coupled to the flexible tray. The diverter diverts the collected moisture away from the structural member.

Figure 1:
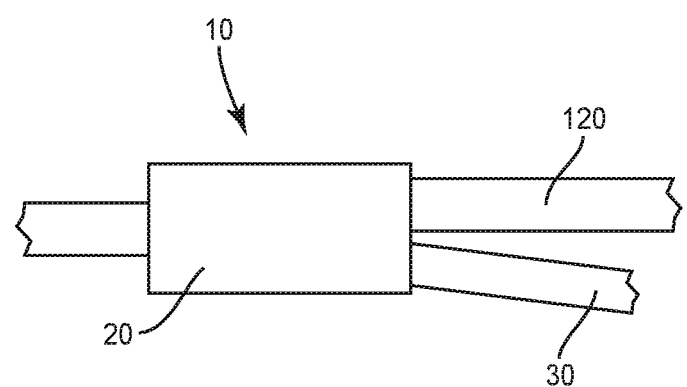
FIG. 1 is a schematic diagram of a device attached to a structural member.

FIG. 1 schematically illustrates a device 10 connected to a structural member 120. The device 10 includes a flexible tray 20 that is connected to the structural member 120. The tray 20 is shaped and sized to collect moisture from the structural member 120. A diverter 30 is coupled to the flexible tray 20 and moves the collected moisture away from the tray 20 and the structural member 120.

Figure 2:
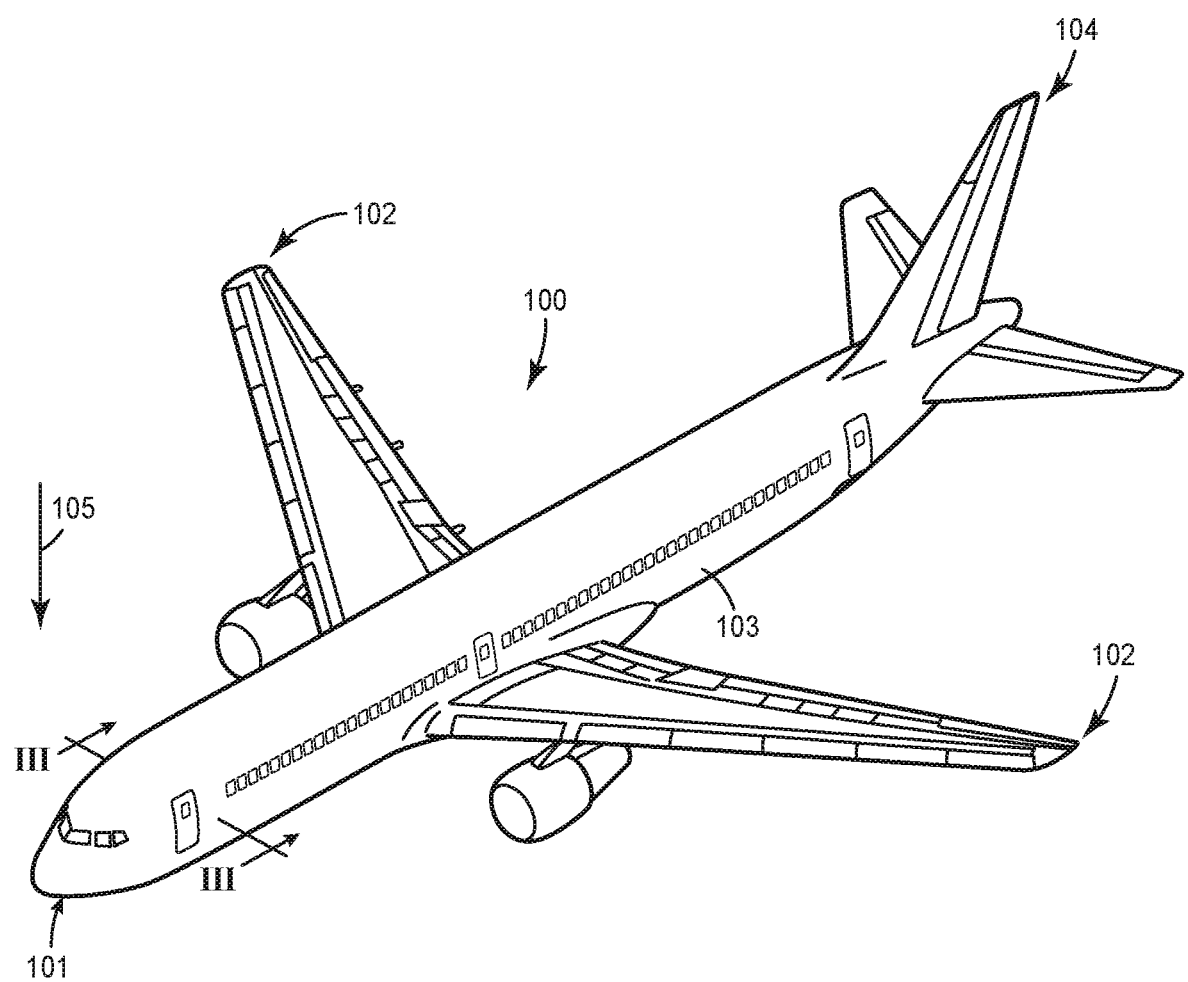
FIG. 2 is a perspective view of a vehicle.

The device 10 can be used with a variety of different vehicles 100. One type of vehicle 100 is an aircraft 100 as illustrated in FIG. 2. The aircraft 100 includes a nose 101, wings 102, a fuselage 103, and a tail 104. FIG. 2 also illustrates a downward arrow 105 indicating the expected direction in which the force of gravity will pull objects, such as liquid moisture, onboard the aircraft 100 in a nominal operational profile.

Figure 3:
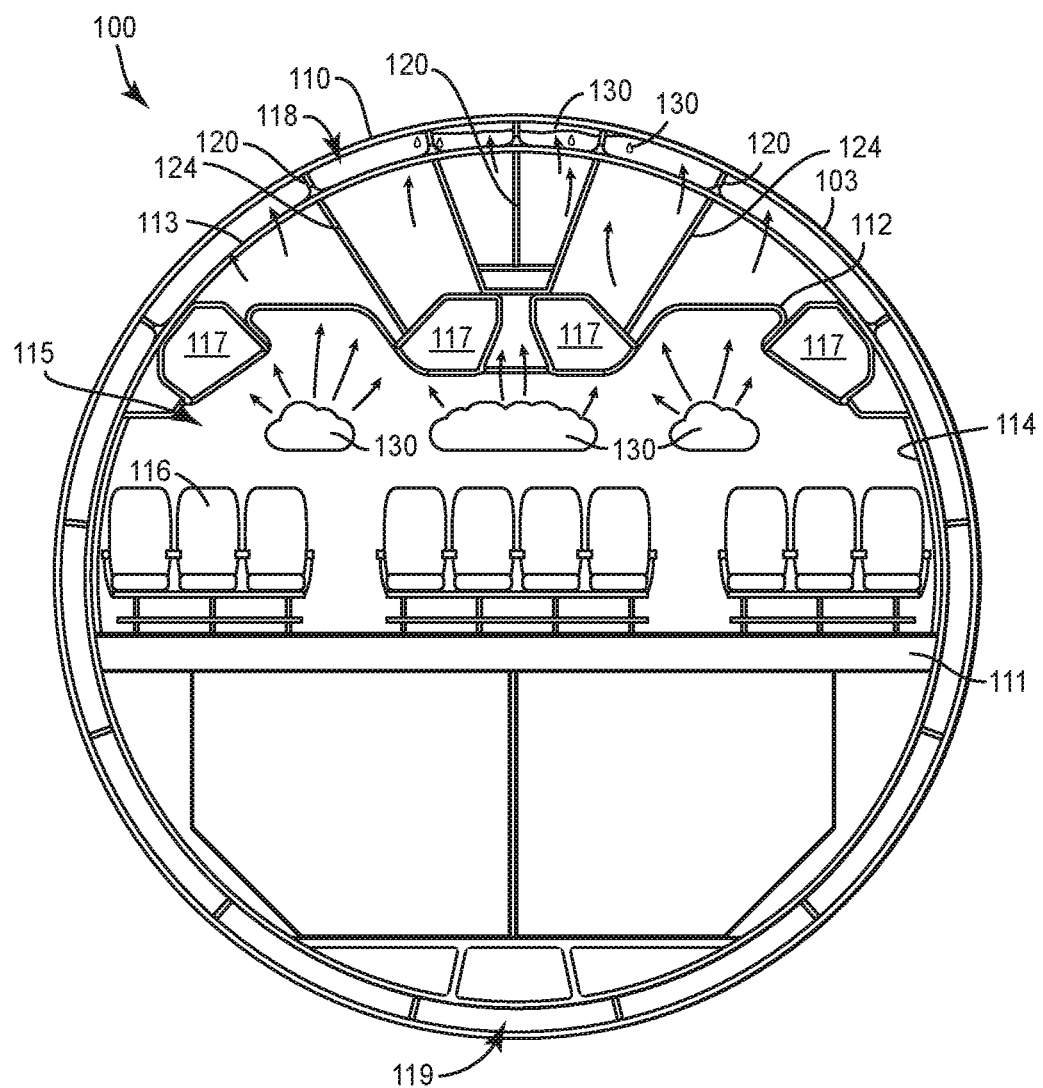
FIG. 3 is a schematic section view of the vehicle of FIG. 2 cut along the line III-III.

FIG. 3 is a cross-sectional, schematic view of the aircraft 100 indicated by view arrows III-III in FIG. 2. FIG. 3 illustrates a simplified version of a portion of the fuselage 103 that includes an outer wall 110, a floor 111, ceiling 112, insulation layer 113, and aesthetic fascia walls 114. For purposes of explanation, the ceiling 112 and/or aesthetic fascia walls 114 represent an "inner wall" of the aircraft. A cabin 115 is formed within the inner wall and includes seats 116, aisles, and various other components for the passengers. Structural members 120 support the different components in the aircraft 100. One type of structural member 120 includes support beams 120 that extend from the outer wall 110. Support members 124 are attached to the structural members 120 to support various components which can include luggage compartments 117, the ceiling 112, ducting, equipment, and racks.

Respiration and other sources of water cause moisture 130 to enter or form in the air in the cabin 115. For example, warm exhaled air includes moisture 130 that rises upward through the luggage compartments 117. Some of this warm and moist air rises through the ceiling 112. Furthermore, some warm air continues to rise upward through the insulation layer 113 into a space 118 between the outer wall 110 and the insulation layer 113.

As the outer wall 110 is cooled by the outside air at high altitude during flight, the temperature of the outer wall 110 eventually decreases to a temperature below the freezing temperature of water. This cooling causes the moisture 130 (e.g., water) to condense out of the air in the space 118 and freeze onto the inner surface of the outer wall 110 as ice. As the temperature increases when the aircraft 100 changes to a lower altitude and/or commences descent for landing, the ice 130 begins to melt causing water droplets 130 to form that travel through the space 118 towards a bottom 119 of the fuselage 103. Some moisture 130 enters gaps in the insulation layer 113, particularly where the support members 124 extend through the insulation layer 113.

The devices 10 are attached to the structural members 120 to capture the moisture 130 from the structural members 120. Some aspects include capturing about twenty to one hundred millimeters of melted frost during each flight. The captured moisture 130 can be diverted down and outboard between the insulation layer 113 and the outer wall 110. The collected moisture 130 is diverted into insulation cap strips and eventually into a bilge and overboard. The devices 10 can be positioned on the inboard side of the insulation layer 113 and/or positioned on the outboard side of the insulation layer 113.

Figure 4:
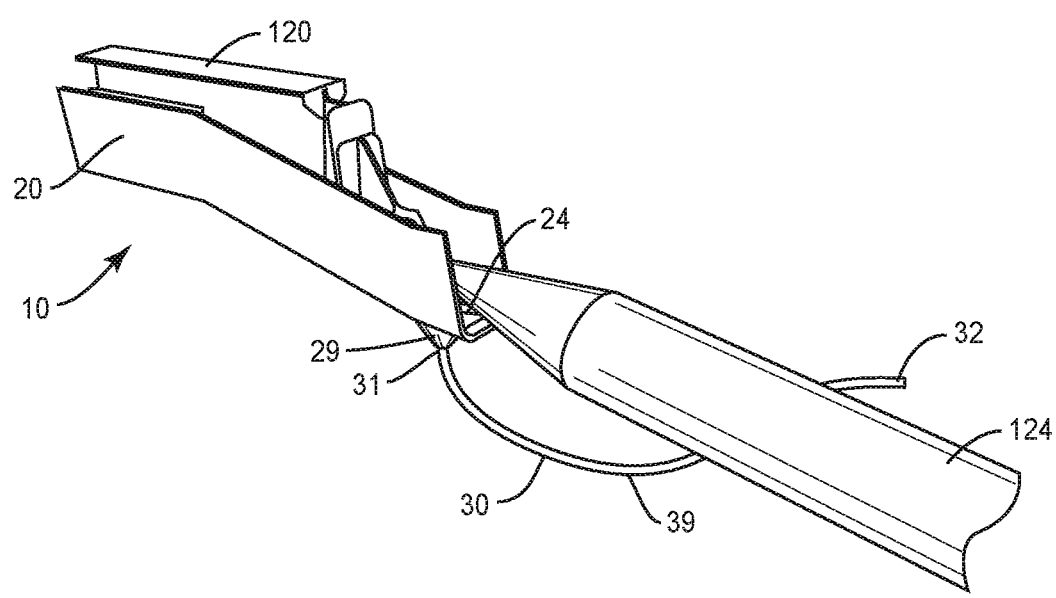
FIG. 4 is a perspective view of a device attached to a structural member.

FIG. 4 illustrates a device 10 attached to a structural member 120. Specifically, FIG. 4 includes the device 10 connected where the structural member 120 attaches to a support member 124. The device 10 includes a tray 20 that is flexible to snap-fit onto the structural support 120. The snap-fit is caused by the flexibility of the lateral sides 21 that can be forced apart and then rebound back towards their original shape to attach to the structural member 120. The diverter 30 is coupled to the tray 20 and diverts the captured moisture away from the tray 20 and structural member 120.

Figure 5:
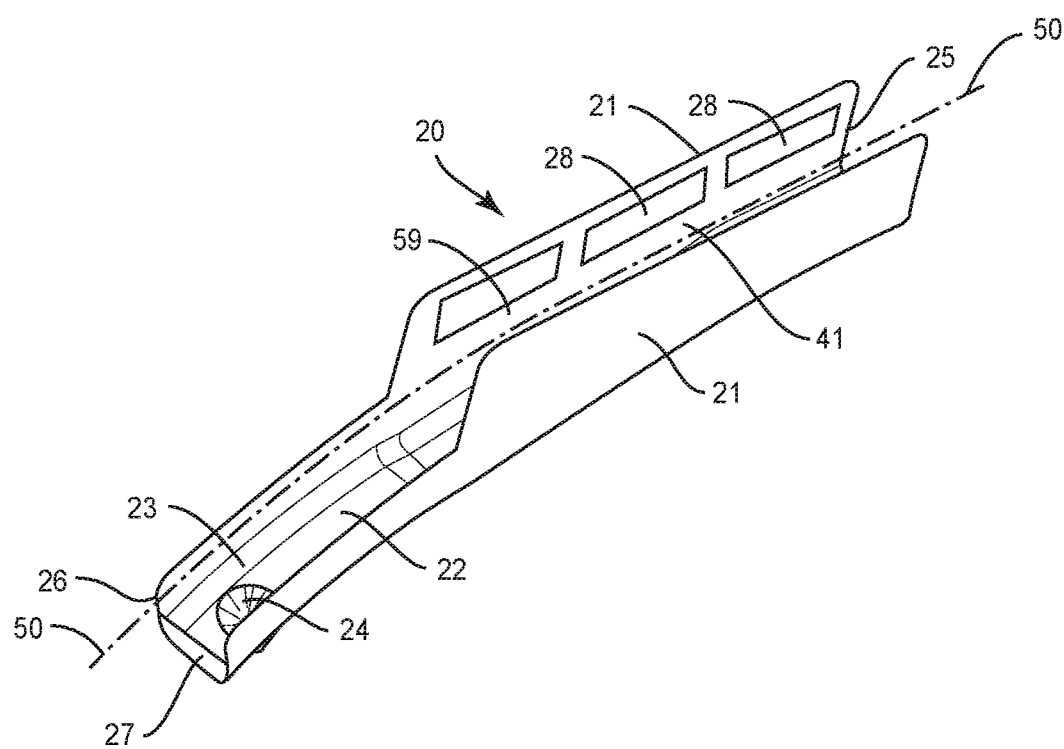
FIG. 5 is a perspective view of a tray.

FIG. 5 illustrates a tray 20 that includes a pair of opposing lateral sides 21 that are connected together by a bottom 22. The lateral sides 21 can extend the entire length of the tray 20 from a first end 25 to a second end 26, or may extend a lesser distance as illustrated in FIG. 5. The sides 21 extend upward from the bottom 22 an amount to capture the moisture 130 and to snap-fit onto the structural member 120. The opposing sides 21 can have the same shape and/or size, or can have different shapes and/or sizes. The sides 21 can be substantially parallel to each other when no external forces are applied to the tray 20. The sides 21 can extend an equal distance from the bottom 22. The sides 21 can also extend different distances from the bottom 22. The sides 21 and the bottom 22 define a substantially C-shaped channel 41 having an opening 59 opposite from the bottom 22. During installation, the device 10 is positioned such that a portion of the structural member 120 passes through the opening 59 and is disposed within the channel 41. The tray 20 is then coupled to the structural member 120 via connectors 28 as described in more detail below.

The tray 20 includes an elongated shape that extends between the first and second ends 25, 26. The elongated shape allows the tray 20 to extend along a length of the structural member 120 and capture the moisture. The tray 20 includes a longitudinal axis 50 that extends between the ends 25, 26.

The bottom 22 extends between and is connected to each of the lateral sides 21. The bottom 22 includes a capture area 23. When the device 10 is attached to a structural member 120, the capture area 23 is vertically lower than a remainder of the tray 20 such that the captured moisture collects in this capture area 23. FIG. 5 includes the bottom 22 with a continuous vertical drop from a first end 25 to a second end 26 with the capture area 23 being positioned at the second end 26. Other aspects can include the capture area 23 positioned at different locations along the bottom 22. Another embodiment includes the capture area 23 positioned at a central area with each of the ends 25, 26 being vertically higher.

An outlet 24 is positioned at the capture area 23 for the moisture 130 to exit from the tray 20 and enter into the diverter 30. The outlet 24 can include a single aperture, or can include multiple apertures. The one or more apertures can extend through the bottom 22, one or both lateral sides 21, or a combination of the bottom 22 and one or both of the lateral sides 21. FIG. 5 includes the outlet 24 being a single aperture that extends through the bottom 22.

The lateral sides 21 include one or more connectors 28 to secure the tray 20 to the structural member 120. The connectors 28 can include hook-and-loop fasteners that engage together or that engages the insulation layer 113. The connectors 28 can also include a strap that is attached to one of the lateral sides 21 and with a length to extend over the structural member 120 and attach to the opposing lateral side 21.

Walls 27 can be positioned at one or both ends 25, 26 to prevent escape of the captured moisture. The walls 27 extend upward from the bottom 22 and between the lateral sides 21.

Figure 6:
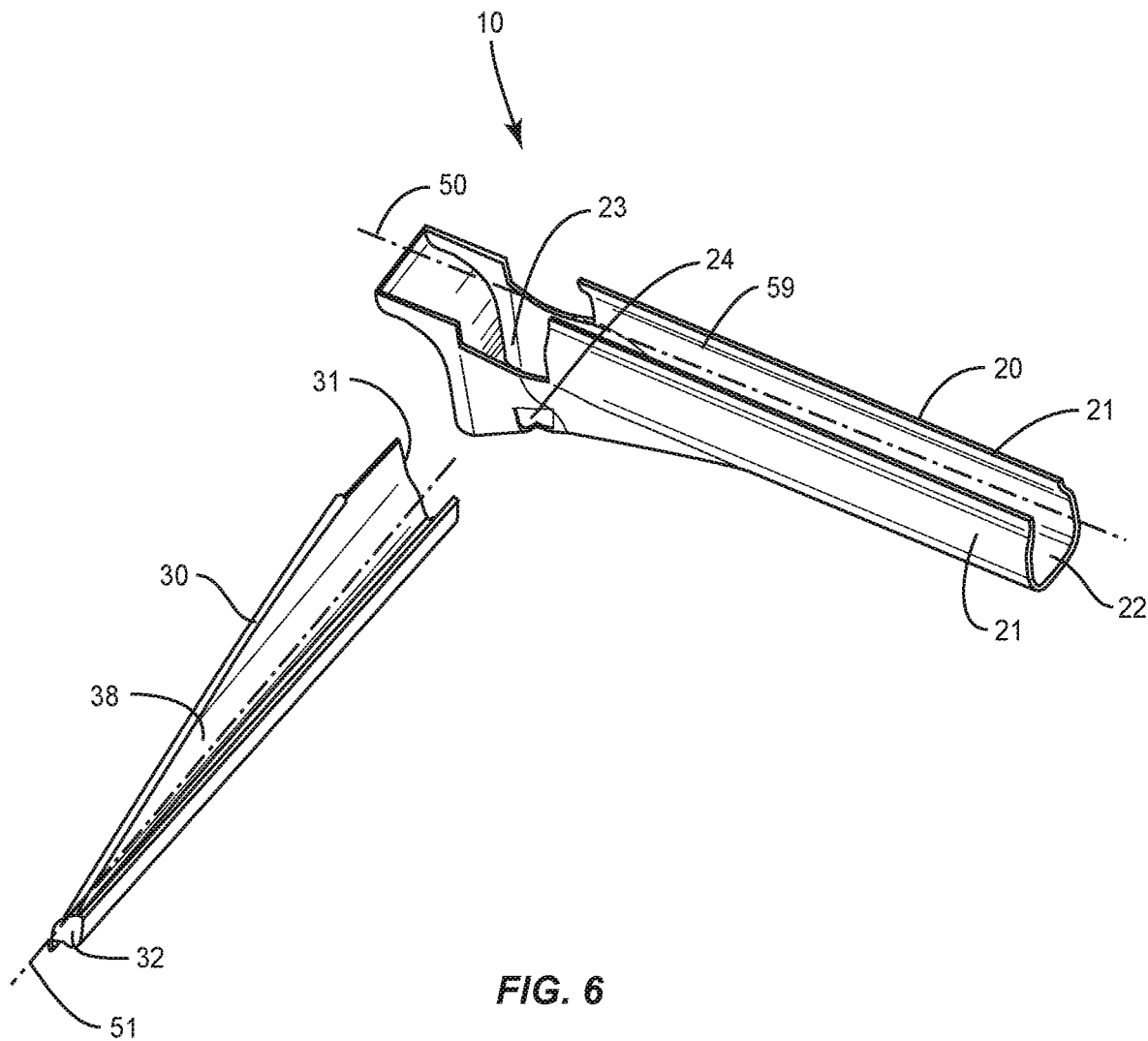
FIG. 6 is an exploded perspective view of a device that includes a tray and a diverter.

As illustrated in FIG. 4, the diverter 30 is coupled to the tray 20 at the outlet 24. Moisture collected by the tray 20 is moved through the outlet 24 and into the diverter 30. The diverter 30 includes a first end 31 at the outlet 24 and a second end 32. The length of the diverter 30 measured between the ends 31, 32 can vary depending upon the context of use. FIG. 4 includes the diverter 30 being a tube 39 with an enclosed interior sized to contain the moisture 130 and transfer the moisture 130 to a remote location away from the structural member 120. FIG. 6 illustrate another device 10 with the diverter 30 being a trough 38 that contains the moisture. FIG. 7 includes a diverter 30 with an open top side 33. The diverters 30 can be flexible to be positioned as needed through the interior of the vehicle 100. Alternatively, the diverters 30 can include a rigid fixed shape.

The diverter 30 can be coupled to the tray 20 in a variety of different manners. The diverters 30 and tray 20 can have an integrally formed unitary construction and be a single, unitary piece, such as with a single molded piece. The coupling may also include mechanical engagement. Referring again to FIG. 4, the tray 20 also includes a protrusion 29 that extends outward from the bottom 22 at the outlet 24. The tube 39 is sized to fit over or within the protrusion 29 to couple the diverter 30 to the tray 20. Adhesive and/or mechanism fasteners can also be used to further couple the diverter 30 and tray 20.

FIG. 6 includes the tray 20 with the outlet 24 at the intersection of the bottom 22 and lateral side 21. The first end 31 of the diverter 30 is shaped and sized to conform to the exterior of the tray 20 at the outlet 24. The diverter 30 includes a longitudinal axis 51. In one aspect as illustrated in FIG. 6, the longitudinal axis 51 of the diverter 30 is substantially perpendicular to the longitudinal axis 50 of the tray 20.

The tray 20 is flexible to snap-fit onto the structural member 120. The diverter 30 can also be flexible, or can be rigid. The tray 20 and diverter 30 can be fabricated from the same or different materials and using the same or different techniques. Examples include but are not limited to fiberglass hand lay-up, vacuum-formed polycarbonate (or other plastic(s)), blow molded, injection molded, and 3D printed. One aspect includes the flexible tray 20 and the diverter 30 each being fabricated from a non-absorbent material. The material can include but is not limited to a close-cell foam and plastic.

The flexibility of the tray 20 is illustrated in FIGS. 8A and 8B. As illustrated in FIG. 8A, the tray 20 is flexible such that the lateral sides 21 can be forced outward away from a plane P that extends through a middle of the tray 20. This increases the width 52 of the opening 59 of the tray 20. A force F applied to the lateral sides 21 flexes the sides 21 outward away from the plane P. When the force F is removed as illustrated in FIG. 8B, the lateral sides 21 rebound inward towards the plane P resulting in a smaller width 52 of the opening 59 measured between the sides 21. The rebound force applied by the sides 21 attaches the tray 20 to the structural member 120. The rebound force applied by the sides 21 to the structural member 120 alone may be adequate to maintain the attachment, or one or more connectors 28 can also be used for the attachment. The lateral sides 21 can be substantially parallel when no forces are acting on the tray 20. The lateral sides 21 can also be angled outward or angled inward when no forces are acting on the tray 20.

FIG. 9A illustrates a tray 20 in an unflexed orientation. The lateral sides 21 angle inward such that the width 52 of the open end 59 is smaller than a width 53 at the bottom 22. FIG. 9B illustrates the lateral sides 21 of the tray 20 flexed outward by a force F to extend around the structural member 120. In this flexed orientation, the width 52 of the opening 59 is larger than a width 123 of the structural member 120. This provides for placing the tray 20 around the structural member 120. As illustrated in FIG. 9C, when the force F is removed from the tray 20, the lateral sides 21 return inward. Because the width 52 of the opening 59 in the unflexed orientation is smaller than the width 123 of the structural member 120, the lateral sides 21 contact against the lateral sides 121 of the structural member 120. This sizing difference prevents the device 10 from falling off the structural member 120. FIG. 9C includes a tray 20 sized with the lateral sides 21 of the tray 20 contacting against the lateral sides 121 of the structural member 120. The tray 20 can include other sizing, such as FIG. 10 with the tray 20 secured to the structural member 120 with the lateral sides 21 spaced away from the lateral sides 121 of the structural member 120. The tray 20 can be attached with the bottom 22 being spaced away from the structural member 120 while the lateral sides 21 are applying a compressive force to the structural member 120.

Figure 10:
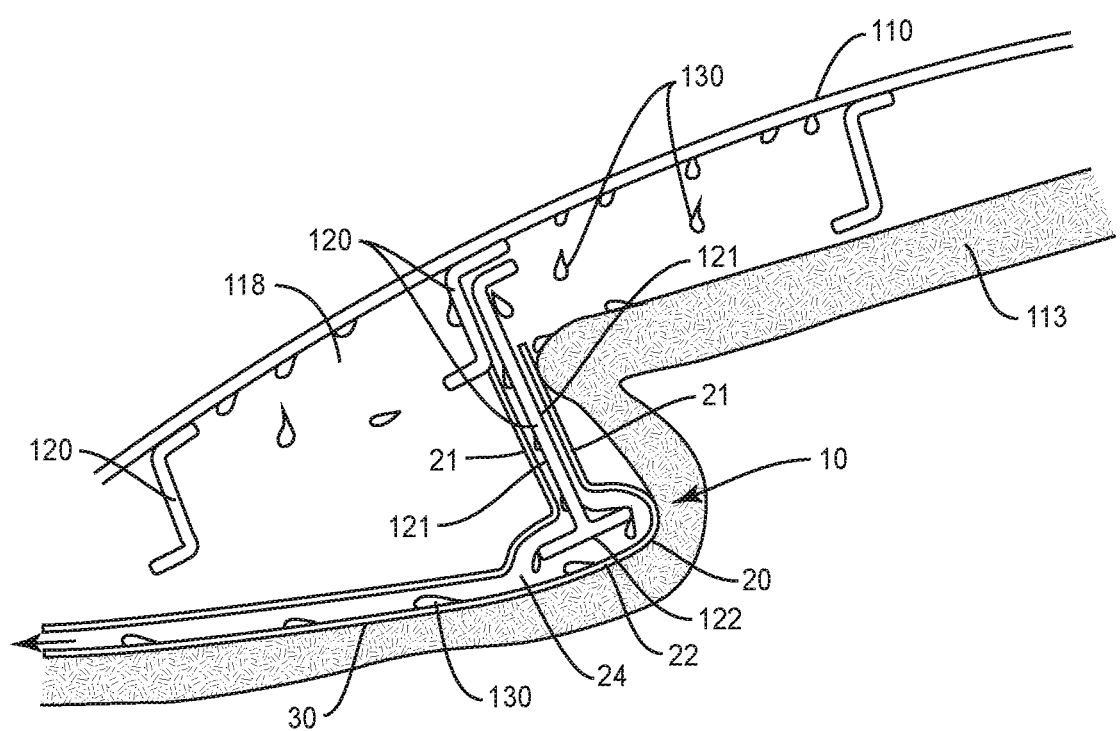
FIG. 10 is a side view of a device attached to a structural member and positioned outboard of an insulation layer.

The device 10 can be positioned at various locations on the vehicle 100. FIG. 10 includes the device 10 positioned at an outboard side of the insulation layer 113 (i.e., between the insulation layer 113 and the outer wall 110 of the vehicle 100). The device 10 is attached with the lateral sides 21 on opposing sides of the structural member 120. This may include the lateral sides 21 of the tray 20 contacting against the lateral sides 121 of the structural member 120, or the lateral sides 21 of the tray 20 spaced away from the lateral sides 121 of the structural member 120. The bottom 22 that extends between the lateral sides 21 is positioned underneath the structural member 120. The lateral sides 21 apply an inward compressive force to the structural member 120 to attach the device 10. Moisture 130 from the structural member 120 is captured by the device 10. Other moisture 130 in the area, such as moisture on the surface of the insulation layer 113, moisture on the outer wall 110, and other components, can also be captured in the tray 20. The diverter 30 is attached at the outlet 24 of the tray 20 to receive the moisture 130. The moisture 130 moves through the diverter 30 to a remote location away from the structural member 120.

Figure 11:
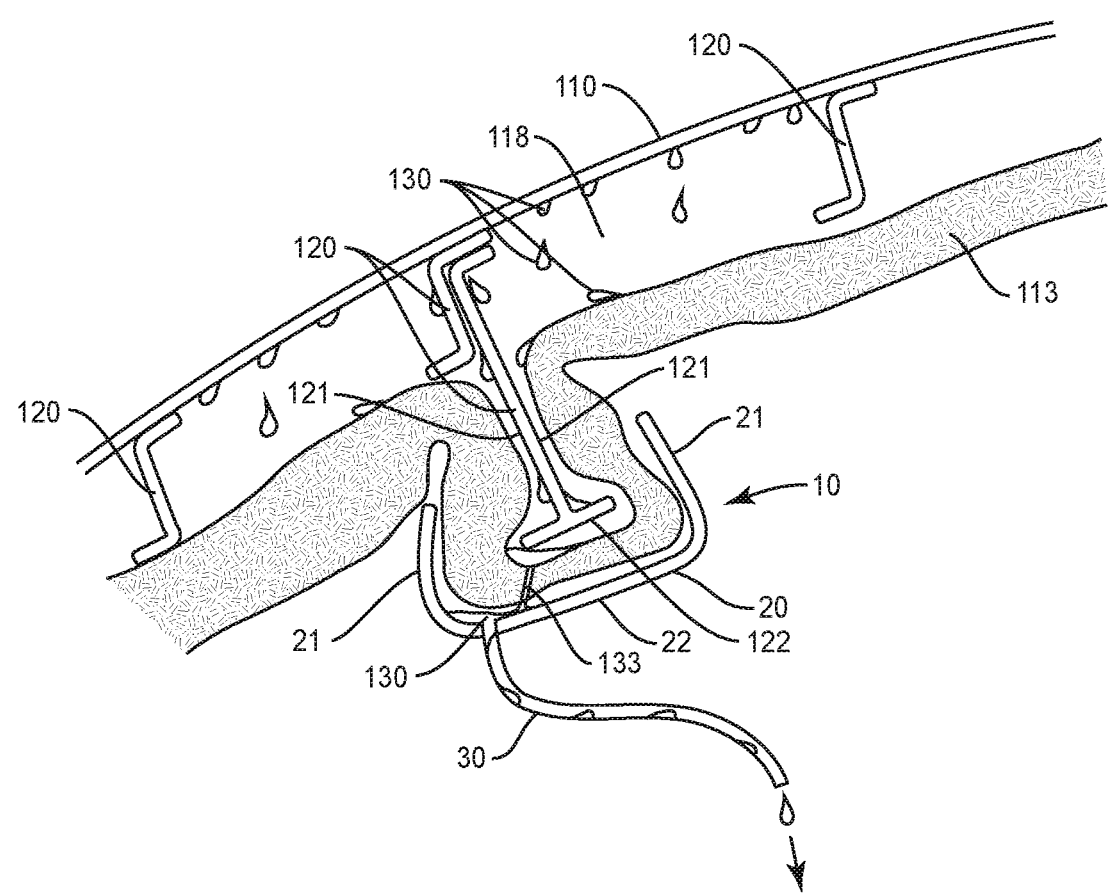
FIG. 11 is a side view of a device attached to a structural member and positioned over an insulation layer and positioned inboard of the insulation layer.

FIG. 11 illustrates the device 10 positioned on an inboard side of the insulation layer 113. The device 10 is sized to extend around the structural member 120 and the insulation layer 113. The lateral sides 21 are on opposing sides of the structural member 120 and the insulation layer 113. The lateral sides 21 apply an inward compressive force to maintain the attachment to the insulation layer 113 and the structural member 120. The moisture 130 from the structural member 120 and the insulation layer 113 collects and moves through the insulation layer 113 to the tray 20. The moisture 130 can move into the tray 20 through overlaps and seams in the insulation layer 113, or the insulation layer 113 can include one or more openings 133 to allow for the moisture 130 to move into the tray 20. The diverter 30 receives the moisture 130 from the tray 20 and directs the moisture 130 to a remote location.

Figure 12:
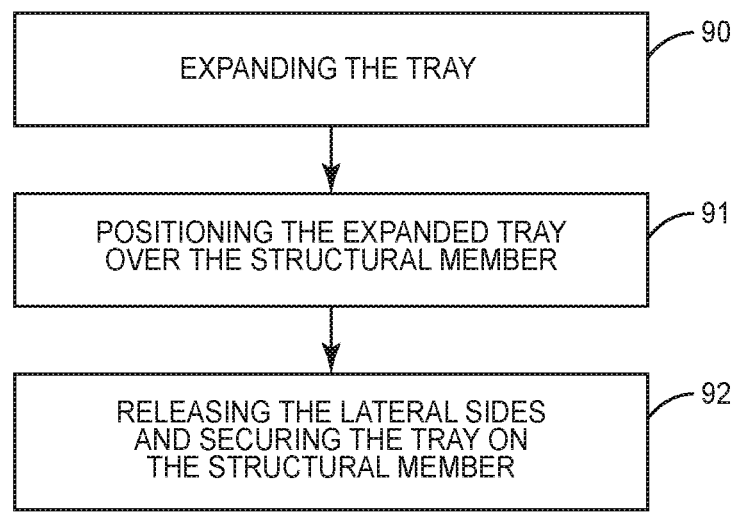
FIG. 12 is a flowchart diagram of a method of attaching a device to a structural member to capture moisture.

FIG. 12 includes a method of capturing moisture 130 from a structural member 120 using a device 10. This includes expanding the tray 20 by moving apart the opposing lateral sides 21 (block 90). The required separation of the lateral sides 21 depends upon the size of the structural member 120 and can also depend upon the size of the insulation layer 113. While expanded, the tray 20 is positioning over the structural member 120 with the lateral sides 21 positioned on opposing sides and the bottom 22 positioned along the bottom of the structural member 120 (block 91). This can also include the lateral sides and bottom positioned over the insulation layer 113 as illustrated in FIG. 11. Once positioned, the lateral sides 21 are released thus applying a compressive force through the lateral sides 21 to the structural member 120 to secure the tray 20 onto the structural member 120 (block 92). Once in position, the tray 20 captures the moisture 130 that from the structural member 120. This moisture 130 moves to the outlet 24 in the tray 20 and into the diverter 30 where is it directed away from the structural member 120.

The device 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A device to capture moisture from a structural member in an aircraft, the device comprising:
    an insulation layer positioned over the structural member in the aircraft, the insulation layer comprising an opening;
    a flexible tray configured to snap-fit onto the insulation layer that is positioned over an exterior of the structural member, the flexible tray positioned vertically below the opening in the insulation layer to collect the moisture from the structural member that moves through the opening, the flexible tray comprising an elongated shape with a first end and a second end;
    an outlet that extends through a bottom of the flexible tray between the first and second ends;
    a diverter coupled to the flexible tray at the outlet and configured to divert the moisture collected by the flexible tray away from the structural member and towards a separate section of the aircraft, wherein the flexible tray and the diverter comprise an integrally formed unitary construction;
    wherein the flexible tray comprises lateral sides configured to extend along opposing sides of the structural member and the bottom that extends between the lateral sides, the flexible tray forms a capture area underneath the insulation layer and the structural member;
    wherein the flexible tray comprises an unflexed orientation with the lateral sides being angled inward with a width of an opening being less than a width of the bottom; and
    wherein the flexible tray is flexible for the lateral sides to be spread-apart by an outside force and the flexible tray to rebound back towards the unflexed orientation to generate a compressive force to snap-fit onto the exterior of the structural member.

2. The device of claim 1, wherein each of the flexible tray and the diverter include a longitudinal axis with the longitudinal axis of the flexible tray being substantially perpendicular to the longitudinal axis of the diverter.

3. The device of claim 1, wherein the flexible tray and the diverter are each fabricated from a non-absorbent material.

4. The device of claim 1, further comprising the outlet positioned at an intersection of the bottom and one of the lateral sides.

5. The device of claim 1, wherein the diverter is a tube with a first end attached to the outlet of the flexible tray and a second end that is spaced away from and vertically below the flexible tray.

6. The device of claim 1, further comprising end walls positioned at ends of the flexible tray, the end walls extend upward from the bottom and between the lateral sides.

7. An aircraft comprising:
    an outer wall;
    a structural member that extends from the outer wall and that includes opposing lateral sides and a bottom that extends between the lateral sides;
    an insulation layer positioned over the structural member, the insulation layer further comprising an opening;
    a moisture capture device positioned on an inboard side of the insulation layer and extending around the insulation layer and the structural member to capture moisture from the structural member that accumulates at the insulation layer and that moves through the opening in the insulation layer, the moisture capture device comprising:
        a flexible tray comprising a channel formed between opposing lateral sides and a bottom, the channel being wider at a lower section than at a top, the flexible tray configured to generate a compressive force when the lateral sides are spread apart to snap-fit onto the insulation layer and the structural member and to collect the moisture from the structural member that moves through the opening; and
        a diverter coupled to the flexible tray and configured to divert the moisture collected by the flexible tray away from the structural member;
    the flexible tray and the diverter comprise an integrally formed unitary construction.

8. The aircraft of claim 7, further comprising an outlet that extends through the bottom of the flexible tray between the first and second ends and with the diverter coupled to the flexible tray at the outlet.

9. The aircraft of claim 7, further comprising end walls positioned at ends of the flexible tray, the end walls extend upward from the bottom and between the lateral sides.

10. The aircraft of claim 7, wherein each of the flexible tray and the diverter comprise a longitudinal axis with the longitudinal axis of the flexible tray being substantially perpendicular to the longitudinal axis of the diverter.

11. The aircraft of claim 7, wherein the diverter is a tube with a first end attached to an outlet of the flexible tray and a second end that is spaced away from and vertically below the flexible tray.

12. A method of capturing moisture from a structural member in an aircraft, the method comprising:
    expanding a flexible tray by moving apart opposing lateral sides of the flexible tray and expanding an opening of the flexible tray formed between top edges of the lateral sides;
    while the flexible tray is expanded, positioning the flexible tray over the structural member with the lateral sides of the flexible tray on opposing sides of the structural member and a bottom of the flexible tray along a bottom of the structural member with the structural member attached at an outer wall of the aircraft;
    releasing the lateral sides and generating a compressive force through the lateral sides to the structural member to secure the flexible tray onto the structural member;
    positioning an end of a diverter away from the flexible tray and vertically below the bottom of the flexible tray, the diverter being attached to the flexible tray, the flexible tray and the diverter comprise an integrally formed unitary construction;
    collecting moisture that runs off the structural member and off the outer wall of the aircraft in the bottom of the flexible tray; and
    directing the moisture along the bottom of the flexible tray and into the diverter and away from the structural member towards an interior of the aircraft.

13. The method of claim 12, further comprising securing the flexible tray to the structural member through just the compressive force applied through the lateral sides.

14. The method of claim 12, wherein expanding the flexible tray comprises applying an outward force to the opposing lateral sides of the flexible tray and increasing a width of the opening of the flexible tray.

15. The method of claim 12, further comprising directly contacting the opposing lateral sides of the flexible tray against the structural member.

16. The method of claim 12, further comprising:
contacting the opposing lateral sides of the flexible tray against an insulation layer that is positioned over the structural member;
positioning the flexible tray vertically below an opening in the insulation layer; and
capturing moisture in the flexible tray that runs off the structural member and moves through the opening in the insulation layer.

17. The method of claim 12, further comprising spacing the bottom of the flexible tray away from the structural member while the lateral sides are applying the compressive force to the structural member.

18. The method of claim 12, further comprising:
collecting the moisture in the bottom of the flexible tray from the structural member;
transferring the moisture from the bottom of the flexible tray to the diverter that is attached to the flexible tray; and
moving the moisture along the diverter and away from the flexible tray.

19. The method of claim 12, further comprising:
expanding the flexible tray by moving apart opposing lateral sides of the flexible tray; and
removing the flexible tray from the structural member.

20. The method of claim 12, further comprising positioning end walls at the ends of the flexible tray and preventing escape of the moisture from the flexible tray.

* * * * *